United States Patent Office 3,530,162
Patented Sept. 22, 1970

3,530,162
N,N-DICHLOROAMINES AND
THEIR PREPARATION
Julius J. Fuchs, Forwood, Wilmington, Del., assignor to
E. I. du Pont de Nemours and Company, Wilmington,
Del., a corporation of Delaware
No Drawing. Continuation-in-part of application Ser. No.
661,491, July 11, 1967. This application July 19, 1968,
Ser. No. 745,974
Int. Cl. C07c 121/42, 121/46, 121/66
U.S. Cl. 260—464                                    2 Claims

ABSTRACT OF THE DISCLOSURE

N,N-dichloroamine compounds such as 1-(N,N-dichloroamino)cyclohexanecarbonitrile are prepared by either (1) chlorinating the corresponding amine such as 1 aminocyclohexanecarbonitrile in the presence of water and a water immiscible inert organic solvent such as carbon tetrachloride while maintaining an approximately neutral pH, by adding a strongly basic acid acceptor such as sodium hydroxide; or (2) chlorinating the corresponding amine in the absence of water, the presence of an inert organic solvent such as carbon tetrachloride, and the presence of a weakly basic acid acceptor such as sodium bicarbonate. The N,N-dichloroamine compounds thus prepared are useful in preparing symmetrical azo compounds such as azo-bis(cyclohexanecarbonitrile).

CROSS-REFERENCE TO RELATED APPLICATIONS

This application is a continuation-in-part of my copending application Ser. No. 661,491, filed July 11, 1967 now abandoned, which in turn is a divisional application of my then copending application Ser. No. 397,022, now U.S. Pat. No. 3,346,554.

BACKGROUND OF THE INVENTION

This invention relates to N,N-dichloroamine compounds of the formula (1)

wherein $R_1$ is alkyl of 1 to 6 carbon atoms;
$R_2$ is alkyl of 1 to 6 carbon atoms or cycloalkyl of 3 to 6 carbon atoms; and
$R_3$ is —CN, —COOM, or —COOR, wherein M is sodium or potassium and R is alkyl of 1 to 6 carbon atoms; and wherein $R_1$ and $R_2$ taken together are cycloalkyl of 4 to 12 carbon atoms, and wherein $R_1$, $R_2$, or $R_3$ is substituted with alkoxy of 1 to 4 carbon atoms, carboxy, carbomethoxy, carboethoxy, phenyl, or from 1 to 3 chlorine atoms; and with the limitation that when $R_1$ and $R_2$ are both alkyl, they must total more than 4 carbon atoms;

and to the preparation of these compounds from the corresponding amine compounds (2)

wherein $R_1$, $R_2$, and $R_3$ are as described above, by either (1) chlorinating the amine in the presence of water, and a water immiscible organic solvent while maintaining an approximately neutral pH by adding a strongly basic acid acceptor; or (2) chlorinating the amine in the absence of water and the presence of an inert organic solvent and a weakly basic acid acceptor.

The N,N-dichloroamine compounds are useful in preparing symmetrical azo compounds as disclosed in U.S. Pat. No. 3,346,554.

The preparation of azo compounds and the use of amines and chlorine in the process are disclosed for example in Anderson, U.S. Pat. No. 2,711,405. However, the process disclosed there is limited to a relatively small class of azo-nitrile products because of low yields encountered with higher molecular weight reactants.

The preparation of chlorinated amine compounds is also old in the art. For example, Jackson et al., JACS Vol. 69, June 1947, pages 15–39, disclose chlorination in an aqueous medium of amines such as butyl amine, in the presence of sodium bicarbonate. Jackson does not suggest the advantages attendant to the use of an organic solvent or the control of pH. Martin, U.S. Pat. No. 3,115,516, also discloses reaction of chlorine with an amine compound and discloses that the reaction can be carried out in an organic solvent or in a system in which the solvent is water. However, Martin discloses only procedures which entail having all of the base present at the beginning of the reaction and Martin does not suggest that weaker bases are required when water is excluded from the reaction system.

I have discovered that compounds of Formula 1 can be prepared in exceptionally good yields by chlorinating the corresponding amine in a mixed water-organic solvent medium while maintaining an approximately neutral pH by addition of a strongly basic acid acceptor. Similar yields are obtained by chlorinating the amines in the absence of water and the presence of an inert organic solvent and a weakly basic acid acceptor. By both of these methods, excessive product decomposition which is caused by contact with an acid or base is avoided by avoiding large excesses of either by-product acid or basic acid acceptor.

SUMMARY

In summary this invention is directed to compounds of Formula 1 and to the methods of preparing them comprising either:

(1)

(a) Contacting the corresponding amine with chlorine in the presence of water, and a water immiscible inert organic solvent, while adding an acid acceptor selected from the group consisting of the alkali metal and alkaline earth metal bases, at a rate sufficient to neutralize by-product HCl being formed and maintain a neutral to slightly basic pH, at a temperature above the freezing point and below the boiling point of the reactants, the amine being present in an amount of from 1 to 25 percent based on the weight of amine, water and organic solvent, and the chlorine being used in an amount in excess of 2 moles per mole of amine;

(b) Separating the water phase from the organic solvent phase; and (c) Recovering the product from the organic solvent phase; or (2)

(a) Contacting the corresponding amine with chlorine in the absence of water and in the presence of an inert organic solvent and a sufficient amount of a weak base to maintain a neutral to basic pH, said base having an ionization constant of from $1 \times 10^{-5}$ to $1 \times 10^{-10}$, and at a temperature above the freezing point and below the boiling point of the reactants, the amine being present in an amount of from 1 to 25 percent based on the weight of amine and solvent, and the chlorine being used in an amount in excess of 2 moles per mole of amine;
(b) Separating the impurities by water extraction; and
(c) Recovering the product from the solvent.

By these methods the N,N-dichloroamine products are obtained in exceptionally good yield because product decomposition is kept to a minimum.

DESCRIPTION OF THE INVENTION

Products

The products of this invention are the N,N-dichloroamine compounds of the formula (1)
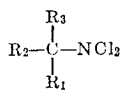

wherein $R_1$ is alkyl of 1 to 6 carbon atoms;
$R_2$ is alkyl of 1 to 6 carbon atoms or cycloalkyl of 3 to 6 carbon atoms; and
$R_3$ is —CN, —COOR, or —COOM, wherein R is alkyl of 1 to 6 carbon atoms, and M is sodium or potassium; and wherein $R_1$ and $R_2$ taken together are cycloalkyl of 4 to 12 carbon atoms and wherein $R_1$, $R_2$ or $R_3$ is substituted with a substituent selected from the group consisting of alkoxy of 1 to 4 carbon atoms, carboxy, carbomethoxy, carboethoxy, phenyl, and from 1 to 3 chlorine atoms; and with the limitation that when $R_1$ and $R_2$ are both alkyl they must total more than 4 carbon atoms.

Those compounds of Formula 1 wherein $R_3$ is —CN are the preferred N,N-dichloroamine compounds of this invention because of the exceptional utility of the symmetrical azo compounds which they form.

Preparation

The compounds of Formula 1 are prepared by reacting corresponding amine with chlorine in accordance with the conditions prescribed under methods (1) and (2) described above.

Methods (1) and (2) can be carried out in any suitable reaction vessel, preferably one equipped with means for agitating the contents.

Both methods (1) and (2) are conducted at temperatures ranging from above the freezing point to below the boiling point of the reaction mixture. For maximum reaction efficiency, the reaction temperature will preferably range from about —10° C. to +10° C.

The amount of chlorine used in methods (1) and (2) is in excess of 2 moles of chlorine per mole of amine compound. The chlorine can be added over any time period but is preferably added over a period of about 30 minutes to avoid rapid formation of large amounts of by-product hydrochloric acid in the reaction system. Large amounts of hydrochloric acid in the reaction system, as indicated by a low pH, cause accelerated product decomposition.

The amount of amine compound used in methods (1) and (2) can range from about 1 to about 25 per cent based on the weight of amine and solvent. Preferably the amine compound is used in an amount ranging from about 2 to about 15 per cent by weight to achieve maximum reaction efficiency.

As mentioned above, method (1) is carried out in the presence of water and a water immiscible organic solvent. Good agitation is usually required to maintain adequate mixing of the two phases. The organic solvents suitable are water immiscible organic liquids which are inert and thus do not enter into the reaction. Representative of suitable organic solvents are methylene chloride, carbon tetrachloride, chloroform, benzene, dichlorobenzene, and trichloroethylene.

The amount of solvent used in method (1) is determined by the solubility of the product. The advantage of the mixed solvent is derived from extracting the product N,N-dichloroamine compound into the organic phase as it is formed thus minimizing the products contact with the basic acid acceptor or by-product acid which are in the aqueous phase. Thus sufficient solvent is used to dissolve the N,N-dichloroamine compound as it is formed. Preferably there is enough solvent present so that 99 percent of the product formed is dissolved in the organic phase.

As mentioned above, method (2) is carried out in an organic solvent in the absence of water. Suitable organic solvents are those which will not enter into the reaction. Representative of the suitable solvents are benzene, methylene chloride, dichlorobenzene, chloroform, carbon tetrachloride, trichloroethylene and methanol.

Representative of suitable acid acceptors for use in method (1) are the alkali metal bases and alkaline earth metal bases. For economy and convenience, the hydroxides, carbonates and bicarbonates of sodium and potassium are preferred.

The acid acceptor is added, according to method (1), at a rate slightly in excess of that needed to neutralize the hydrochloric acid being formed, thereby maintaining an approximately neutral pH or having present only a small excess of base in the reaction system. Care should be taken to avoid a large excess or deficiency of acid acceptor as product decomposition is accelerated at either very high or very low pH. However, such extremes can of course be tolerated for short periods of time without extensive product decomposition.

The acid acceptors suitable for use in method (2) are weakly basic acid acceptors, generally those having an ionization constant of from $1 \times 10^{-5}$ to $1 \times 10^{-10}$. The weakly basic acid acceptors are required in method (2) because of the more intimate contact between the acid acceptor and the product as formed. Representative of suitable acid acceptors for method (2) are sodium carbonate, sodium bicarbonate and calcium carbonate.

The base is ordinarily suspended in the organic solvent in amounts which are slightly in excess of the amount required to neutralize the hydrochloric acid formed during the reaction.

The product N,N-dichloroamine can be recovered from the organic solvent in method (1) after separating the water phase, by stripping the solvent off of the product through simple concentration procedures, either at atmospheric pressure or under vacuum.

The product N,N-dichloroamines can be recovered in method (2) by separating the impurities and salts such as by water extraction and then stripping off the solvent as in mtehod (1).

Utility

As pointed out above, the N,N-dichloroamine compounds of this invention are most useful in preparing symmetrical azo compounds. The preparation of the azo compounds from the products of this invention is explained in U.S. Pat. No. 3,346,554.

This invention is further exemplified in the following illustrative examples wherein parts and percentages are by weight unless otherwise noted.

EXAMPLE 1

A solution of 62 parts of 1-aminocyclohexanecarbonitrile in 335 parts methylene chloride is agitated at 0° C. with 40 parts of calcium carbonate for 15 minutes. To this reaction mixture is then added 35.5 parts chlorine gas at 0–5° C. with good agitation. The reaction mixture is washed with water and then separated, dried with calcium chloride and the methylene chloride evaporated under vacuum. There remains 94.3 parts of yellow 1-(N,N-dichloroamino)cyclohexanecarbonitrile of 98.15% purity (as indicated by liberation of iodine), which represents a 96% yield.

EXAMPLE 2

To a solution of 63.2 parts of 2-amino-2,4-dimethyl-pentanonitrile in 200 parts of methylene chloride and 150 parts of water are added 80 parts 50% sodium hydroxide and seventy-one parts of chlorine gas with good agitation at 0–5° C. The sodium hydroxide is added at such a rate that the pH of the reaction mixture remains between 7 and 10. After the reaction is completed water is added to dissolve the precipitated sodium chloride, the lower layer of the mixture is separated and dried with calcium chloride and the solvent evaporated under reduced pressure. The 2 - (N,N - dichloroamino) - 2,4-dimethylpentanonitrile is obtained as heavy, yellow, oily residue.

EXAMPLE 3

To a solution of 56.1 parts 2-amino-2-ethylbutyronitrile in 400 parts of carbon tetrachloride are added 95 parts sodium bicarbonate. Seventy-one parts chlorine gas are then introduced with agitation at a temperature of 0–5° C. The 2-(N-N-dichloroamino)-2-ethylbutyronitrile which separates as a heavy, yellow oil is decanted, washed with water, and dried with calcium chloride.

EXAMPLE 4

To a solution of 69.2 parts 1-amino-2-methylcyclohexanecarbonitrile in 250 parts water and 250 parts methylene chloride are added 71 parts chlorine gas and 80 parts 50% sodium hydroxide solution at 0–5° C., at such a rate as to keep the pH of the reaction mixture between 7–10. The product is slurried with water and the 1 - (N,N - dichloroamino) - 2 - methylcyclohexanecarbonitrile, a heavy yellow oil, is separated and dried with calcium chloride.

EXAMPLE 5

To a solution of 78 parts 2,4 - dimethyl - 2 - amino - 4-methoxypentanonitrile in 400 parts methanol are added 113 parts potassium bicarbonate. To this mixture is added 71 parts chlorine gas with good agitation at 0–5° C. The reaction product is filtered and contains the 2,4-dimethyl-2-(N,N-dichloroamino)-4-methoxypentanonitrile in the filtrate, from which it can be isolated by evaporation of the methanol under reduced pressure. However, in this instance, the N,N-dichloroamine product is coupled to the corresponding azo compound prior to the evaporation by the addition of potassium hydroxide to the filtrate.

EXAMPLES 6–7

By substituting molecular equivalent amounts of the amine starting material shown below for the amine compound in Example 1, the corresponding N,N-dichloroamine compound is obtained.

| Amine starting material | N,N-dichloroamine product |
|---|---|
| 6. 2-amino-2-methylpropionitrile | 2-(N,N-dicloroamino)-2-methylpropionitrile. |
| 7. 4-amino-4-cyanopentanoic acid. | 4-(N,N-dichloroamino)-4-cyanopentanoic acid. |

EXAMPLES 8–9

By substituting molecular equivalent amounts of the amine starting material shown below for the amine compound in Example 2, the corresponding N,N-dichloroamine compound is obtained.

| Amine starting material | N,N-dichloroamine product |
|---|---|
| 8. 1-amino-1-cyanocyclobutane. | 1-(N,N-dichloroamino)-cyclobutanecarbonitrile. |
| 9. 2-amino-2-cyclopropylpropionitrile. | 2-(N,N-dichloroamino)-2-cyclopropylpropionitrile. |

EXAMPLES 10–12

By substituting molecular equivalent amounts of the amine starting material shown below for the amine compound in Example 3, the corresponding N,N-dichloroamine compound is obtained.

| Amine starting material | N,N-dichloroamine product |
|---|---|
| 10. 1-amino-1-cyanocyclobutane. | 1-(N,N-dichloroamino)-cyclobutanecarbonitrile. |
| 11. Ethyl 4-amino-4-cyanopentanoate. | Ethyl 4-(N,N-dichloroamino)-4-cyanopentanoate. |
| 12. Methyl 4-amino-4-cyanopentanoate. | Methyl 4-(N,N-dichloroamino)-4-cyanopentanoate. |

EXAMPLES 13–22

By substituting molecular equivalent amounts of the amine starting material shown below for the 1-amino-2-methylcyclohexanecarbonitrile of Example 4, the corresponding N,N-dichloroamine compound is obtained.

| Amine starting material | N,N-dichloroamine product |
|---|---|
| 13. Butyl 2-aminopropionate. | Butyl 2-(N,N-dichloroamino)-propionate. |
| 14. Dimethyl 2-aminosuccinate. | Dimethyl 2-(N,N-dichloroamino)-succinate. |
| 15. Hexyl 2-aminobutyrate. | Hexyl 2-(N,N-dichloroamino)-butyrate. |
| 16. 2-amino-3-methoxybutyronitrile. | 2-(N,N-dichloroamino)-3-methoxybutyronitrile. |
| 17. 2-amino-3-butoxybutyronitrile. | 2-(N,N-dichloroamino)-3-butoxybutyronitrile. |
| 18. Diethyl 2-aminoglutarate. | Diethyl 2-(N-N-dichloroamino)-glutarate. |
| 19. Methyl 2-amino-2-cyclopentylpropionate. | Methyl 2-(N,N-dichloroamino)-2-cyclopentylpropionate. |
| 20. Methyl 1-aminocyclohexanecarboxylate. | Methyl 1-(N,N-dichloroamino)-cyclohexanecarboxylate. |
| 21. 2-amino-2-ethylbutyronitrile. | 2-(N-N,dichloroamino)-2-ethylbutyronitrile. |
| 22. Sodium 1-amino-4-ethylcyclohexanecarboxylate. | Sodium 1-(N,N-dichloroamino)-4-ethylcyclohexanecarboxylate. |

EXAMPLES 23–40

By substituting molecular equivalent amounts of the amine starting material shown below for the amine compound in Example 5, the corresponding N,N-dichloroamine compound is obtained.

| Amine starting material | N,N-dichloroamine product |
|---|---|
| 23. 2-amino-2-hexyl-octanonitrile. | 2-(N,N-dichloroamino)-2-hexyl-octanonitrile. |
| 24. Potassium 2-amino-2-cyclohexylpropionate. | Potassium 2-(N,N-dichloroamino)-2-cyclohexylpropionate. |
| 25. 2-amino-2-methyl-3-phenylpropionitrile. | 2-(N,N-dichloroamino)-2-methyl-3-phenylpropionitrile. |
| 26. Potassium 1-aminocyclohexylcarboxylate. | Potassium 1-(N,N-dichloroamino)-cyclohexylcarboxylate. |
| 27. Sodium 1-aminocyclopentylcarboxylate. | Sodium 1-(N,N-dichloroamino)-cyclopentylcarboxylate. |
| 28. 2-amino-2-methyl-3-methoxypropionitrile. | 2-(N,N-dichloroamino)-2-methyl-3-methoxypropionitrile. |
| 29. Ethyl 1-aminocyclohexylcarboxylate. | Ethyl 1-(N,N-dichloroamino)-cyclohexylcarboxylate. |
| 30. Ethyl 4-amino-4-cyanopentanoate. | Ethyl 4-(N,N-cidhloroamino)-4-cyanopentonoate. |
| 31. Sodium 1-amino-4-ethylcyclohexanecarboxylate. | Sodium 1-(N,N-dichloroamino)-4-ethylcyclohexanecarboxylate. |
| 32. 1-aminocyclododecanecarbonitrile. | 1-(N,N-dichloroamino)-cyclododecanecarbonitrile. |
| 33. 1-aminocyclooctanecarbonitrile. | 1-(N,N-dichloroamino)cyclooctanecarbonitrile. |
| 34. 4-amino-4-cyanopentanoic acid. | 4-(N,N-dichloroamino)-4-cyanopentanoic acid. |
| 35. 2-amino-2-cyanobutyric acid. | 2-(N,N-dichloroamino)-2-cyanobutyric acid. |
| 36. 2-amino-2-methylpropionitrile. | 2-(N,N-dichloroamino)-2-methylpropionitrile. |
| 37. 2-amino-2-cyclopropylpropionitrile. | 2-(N,N-dichloroamino)-2-cyclopropylpropionitrile. |
| 38. Methyl 1-aminocyclopentanecarboxylate. | Methyl 1-(N,N-dichloroamino)-cyclopentanecarboxylate. |
| 39. 2-amino-2-methyl-5-chloropentanonitrile. | 2-(N,N-dichloroamino)-2-methyl-5-chloropentanonitrile. |
| 40. 2-amino-2-methyl-5,5,5-trichloropentanonitrile. | 2-(N,N-dichloroamino)-2-methyl-5,5,5-trichloropentanonitrile. |

I claim:
1. A process for preparing an N,N-dichloroamine compound of the formula

(1)

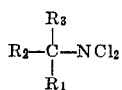

wherein
R₁ is alkyl of 1 to 6 carbon atoms;
R₂ is alkyl of 1 to 6 carbon atoms or cycloalkyl of 3 to 6 carbon atoms;
R₃ is —CN; and
wherein
R₁ and R₂ taken together are cycloalkyl of 4 to 12 carbon atoms; and wherein R₁ or R₂ is substituted with a substituent selected from the group consisting of alkoxy of 1 to 4 carbon atoms, carboxy, carbomethoxy, carboethoxy, phenyl and from 1 to 3 chlorine atoms; and with the limitation that when R₁ and R₂ are both alkyl they must total more than 4 carbon atoms;
comprising (a) contacting an amine compound of the formula (2) 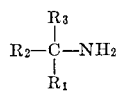

wherein R₁, and R₂ and R₃ are as defined above for Formula 1, with chlorine in the presence of water, and a water immiscible inert organic solvent, while adding an acid acceptor selected from the group consisting of the alkali metal and alkaline earth metal bases at a rate sufficient to neutralize the by-product HCl being formed and maintain a neutral to slightly basic pH, at a temperature above the freezing point and below the boiling point of the reactants, the amine being present in an amount of from 1 to 25 percent based on the weight of amine, water and organic solvent, and the chlorine being used in an amount in excess of 2 moles per mole of amine, (b) separating the water phase from the organic solvent phase, and (c) recovering the product from the organic solvent phase.

2. N,N-dichloroamine compounds of the formula:

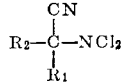

wherein
R₁ is alkyl of 1 to 6 carbon atoms; and
R₂ is alkyl of 1 to 6 carbon atoms or cycloalkyl of 3 to 6 carbon atoms; and
wherein
R₁ and R₂ taken together are cycloalkyl of 4 to 12 carbon atoms; and wherein R₁ or R₂ is substituted with a substituent selected from the group consisting of alkoxy of 1 to 4 carbon atoms, carboxy, carbomethoxy, carboethoxy, phenyl, and from 1 to 3 chlorine atoms; and with the limitation that when R₁ and R₂ are both alkyl they must total more than 4 carbon atoms.

References Cited

UNITED STATES PATENTS

| | | | |
|---|---|---|---|
| 2,472,361 | 6/1949 | Arsem | 260—583 |
| 2,713,576 | 7/1955 | De Benneville | 260—482 |
| 3,115,516 | 12/1963 | Martin. | |
| 3,137,728 | 6/1964 | Reid | 260—534 |
| 3,390,146 | 6/1968 | Nield et al. | 260—465.5 |

FOREIGN PATENTS 935,313  8/1963  Great Britain.

OTHER REFERENCES

Jackson et al., Journal of American Chemical Society, volume 69, pp. 1539–1540, (1947).

Degering, An Outline of Organic Nitrogen Chemistry, pp. 211–214.

Smith, Open Chain Nitrogen Compounds, volume 1, pp. 201 and 207 (1965).

JOSEPH PAUL BRUST, Primary Examiner

U.S. Cl. X.R.

260—465, 465.4, 465.5, 468, 471, 482, 514, 518, 534